2,908,639
METHOD FOR THE REGENERATION OF ZEOLITE MOLECULAR SIEVE SOLID SELECTIVE ADSORBENTS

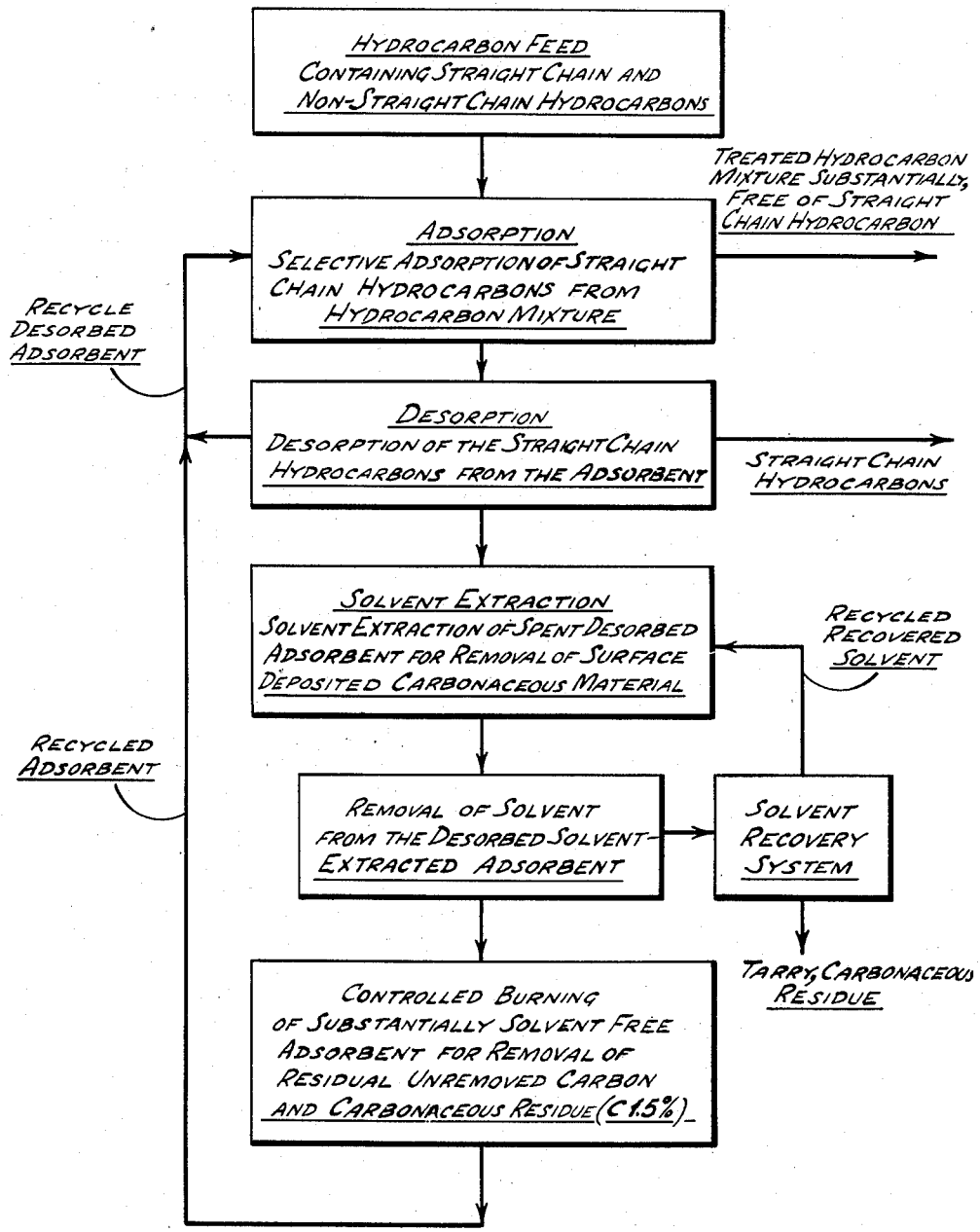

Norman D. Carter, Poughkeepsie, Howard V. Hess, Glenham, and Michael D. Riordan, Fishkill, N.Y., assignors to Texaco Inc., a corporation of Delaware Application June 16, 1955, Serial No. 515,958

2 Claims. (Cl. 208—310)

This invention relates to an improved method for the regeneration of solid selective adsorbents employed for separating organic mixtures based on differences in the molecular dimensions of the components present in the organic mixtures.

The term solid selective adsorbent employed herein refers to a class of alumino-silicate adsorbents characterized by having a porous structure with openings or passages in this structure that are of uniform size and of molecular dimension. Thus, one type of solid selective adsorbent, a sodium calcium alumino-silicate sold under the trade name Linde 5A Molecular Sieve, has pore dimensions of about 5 Angstrom units. Such adsorbents are capable of adsorbing within their pores molecules having critical diameters smaller than the diameter of the pores. As an illustration, an alumino-silicate selective adsorbent of the type referred to, when contacted with a mixture of n-pentane, a straight chain hydrocarbon, and isopentane, a non-straight chain hydrocarbon, exhibits the property of adsorbing n-pentane within its pores to the substantial exclusion of isopentane.

When selective adsorbents of the type described above are contacted with a mixture of hydrocarbons the pore openings will be filled with adsorbed straight chain hydrocarbons until the selective adsorbent is substantially saturated, i.e., the capacity of the adsorbent has been spent. A customary procedure, at this point, is to remove the solid adsorbent containing the adsorbed hydrocarbons from contact with the treated mixture of hydrocarbons. The adsorbent is then subjected to conditions designed to reactivate the adsorbent by removing or desorbing the adsorbed hydrocarbons. Such desorption is frequently conducted by heating the adsorbent at elevated temperatures until the adsorbed material is driven from the pores. A preferred desorption technique involves purging the adsorbent with a hot purge gas concurrently with or immediately following the heating step. In this manner substantially all of the pore-adsorbed hydrocarbons are removed and the adsorbent is ready for contact with a fresh hydrocarbon feed mixture in another adsorption cycle.

While such desorption techniques have been effective, nevertheless, it has been observed that the efficiency of the adsorbent gradually diminishes in proportion to the number of adsorption-desorption cycles due to the formation or deposition of a coating of a relatively high boiling high molecular weight tarry or carbonaceous material on the surface of the adsorbent. This condition becomes progressively worse until the adsorbent has been rendered substantially totally ineffective as a selective adsorbent, presumably due to the carbonaceous material plugging the pore openings on the surface. It is postulated that unsaturated compounds, such as heterocyclic compounds, olefins and other unsaturated aliphatic hydrocarbons and condensed aromatic hydrocarbons initially adsorbed on the surface of the adsorbent or created during the adsorption-desorption cycles from relatively saturated hydrocarbons (straight chain hydrocarbons and/or non-straight chain hydrocarbons) under the relatively high temperature desorption conditions polymerize and/or decompose on the surfaces of the adsorbent to form a tarry carbonaceous material and effectively block or seal the pore openings. Analysis has shown that this carbonaceous material may amount to 5–7 percent or more by weight of the selective adsorbent.

Attempts to remove this carbonaceous coating have consisted of burning in the presence of controlled amounts of oxygen or air. While this procedure is effective to some extent, particularly where the coating does not comprise more than 1.5 percent by weight of the spent adsorbent, it has proven difficult to control the rate of burning. Where more than about 1.5 percent carbonaceous material is present on the adsorbent and burning is employed to remove this material, the burning rate tends to get out of control producing high temperatures which have an adverse effect on the properties of the adsorbent. In some instances, the temperature will go so high, i.e., about 1100° F. or higher, that the crystalline structure of the alumino-silicate adsorbent is broken down with resultant total loss of its adsorptive properties.

An improved method has now been discovered for regenerating solid selective adsorbents to substantially their original adsorptive capacity without the risk of excessive burning temperatures with resultant destruction of the adsorbent.

A principal object of this invention is to provide an improved method for regenerating solid alumino-silicate selective adsorbents to substantially their original adsorptive capacity. Another object is to provide a method for greatly extending the useful life of solid alumino-silicate selective adsorbents. A further object is to provide a regeneration process for solid alumino-silicate selective adsorbents wherein the likelihood of destruction of the adsorbent is substantially eliminated. These and other objects of the invention will become obvious from the following description, examples, and drawing wherein Figure 1 is a blocked out diagram of the process of the invention.

In accordance with the present invention, a process is provided for regenerating a solid alumino-silicate selective adsorbent having a reduced or exhausted capacity due to the accumulation of surface-deposited high molecular weight tarry or carbonaceous material thereon which comprises, contacting the adsorbent with a liquid organic solvent for said surface-deposited carbonaceous material to dissolve said surface-deposited material, drying the adsorbent to free it from adhering solvent and to effect solvent recovery, and heating the adsorbent, now having a substantially reduced amount of carbonaceous material in the ignition temperature of said carbonaceous material in the presence of controlled amounts of an oxygen-containing gas to effect oxidation of the remaining carbonaceous material.

Suitable selective solvents comprise any normally liquid solvent for relatively high molecular weight tarry or carbonaceous material and include the normally liquid alcohols, ethers, esters, ketones, as well as the various aromatic hydrocarbons and the halogenated hydrocarbons. In a preferred embodiment of the invention, and in order to effect rapid separation or recovery of the solvent from the adsorbent, the solvent employed in the extraction step is one having a critical diameter greater than the diameter of the pores of the alumino-silicate adsorbent undergoing treatment in accordance with this invention such that the solvent is not adsorbed within the pores of the alumino-silicate adsorbent.

Any solid alumino-silicate selective adsorbent which selectively adsorbs straight chain hydrocarbons to the substantial exclusion of non-straight chain hydrocarbons can be treated in the practice of this invention. Alumino-silicate selective adsorbents suitably treated in accordance with this invention include certain natural or synthetic zeolites or alumino-silicates, such as a calcium aluminosilicate, which exhibit the property of a molecular sieve, i.e., matter made up of porous crystals wherein the pores of the crystals are of molecular dimension and are of substantially uniform size. A particularly suitable solid selective adsorbent for straight chain hydrocarbon is a calcium alumino-silicate manufactured by Linde Air Products Company and designated Linde Type 5A Molecular Sieve. The crystals of this particular calcium alumino-silicate, apparently actually a sodium calcium alumino silicate, have a pore size or diameter of about 5 Angstrom units, a size sufficiently large to admit straight chain hydrocarbons, such as the normal paraffins and normal olefins, to the substantial exclusion of the non-straight chain hydrocarbons such as the naphthenic, aromatic, isoparaffinic and isoolefinic hydrocarbons.

Other solid selective adsorbents which may be satisfactorily treated include the synthetic and natural zeolites which, when dehydrated, may be described as crystalline zeolites having a rigid three dimensional anionic network and having interstitial dimensions sufficiently large to adsorb straight chain hydrocarbons but sufficiently small to exclude non-straight chain hydrocarbons possessing larger molecular dimensions. The naturally occurring zeolite, chabazite, exhibits such desirable properties. Another suitable naturally occurring zeolite is analcite, $NaAlSi_2O_6 \cdot H_2O$, which, when dehydrated, and when all or part of the sodium is replaced with an alkaline earth metal such as calcium, yields a material which may be represented by the formula $(Ca,Na_2)Al_2Si_4O_{12} \cdot 2H_2O$ and which, after a suitable conditioning, will adsorb straight chain hydrocarbons to the substantial exclusion of non-straight chain hydrocarbons. Naturally occurring or synthetically prepared phacolite, and gmelinite, harmotome and the like or suitable base exchange modifications of these zeolites are also suitable.

Other solid inorganic or mineral selective adsorbents are known and may be treated in accordance with the practice of this invention. It is contemplated that other solid adsorbents suitable for treatment having a property of selectively adsorbing straight chain hydrocarbons to the substantial exclusion of non-straight chain hydrocarbons in the manner of a molecular sieve may be obtained by suitable modification of various oxide gels, especially metal oxide gels of the polyvalent amphoteric metals.

The solid alumino-silicate selective adsorbents which are suitably treated in accordance with this invention are particularly valuable for treating hydrocarbon mixtures for the adsorptive separation of certain components by selective adsorption based on the critical molecular dimension of these components. A petroleum fraction suitable for fractionation by the subject adsorbents with the eventual deposition of a relatively high molecular weight tarry material on the surface of the aluminosilicate adsorbent after a number of repetitive adsorption-desorption operations might have an initial boiling point in a range 50° to 300° F. and an end point in the range 200° F. to 475° F. more or less, and a composition in the range:

| Hydrocarbon type: | Percent by volume |
| --- | --- |
| Naphthenes | 0–75 |
| Aromatics | 0–50 |
| Paraffins (including n-paraffins and isoparaffins) | 5–90 |
| Unsaturates (including n-olefins and isoolefins) | 0–50 |

Typical refinery stocks or fractions which would appear to deposit a coating of carbonaceous material on the surface of an alumino-silicate adsorbent include a wide boiling straight run naphtha, a light straight run naphtha, a heavy straight run naphtha, a catalytic cracked naphtha, a thermal cracked and a thermal reformate naphtha.

It is, of course, to be understood that the solid selective adsorbents to be regenerated according to the practice of the present invention will have first been subjected to a plurality of adsorption-desorption cycles for the separation of pore-adsorbed straight chain hydrocarbons wherein tarry carbonaceous material is deposited on the surface of the adsorbent with the result that the adsorbent will be in a partially spent or substantially exhausted condition. The adsorption and desorption operations, as such, however, form no part of this invention.

The adsorption-desorption operations may be carried out at any suitable temperature or pressure. For example, adsorption and desorption operations may be carried out at the same or different pressures and temperatures in the ranges of 0–10,000 p.s.i.g. and at a temperature in the range 300–1000° F. respectively, depending upon the composition of the mixture undergoing separation. Generally, an adsorption-desorption pressure in the range of 10–2000 p.s.i.g. is suitable. It is sometimes desirable to carry out the desorption operation at a pressure lower than the adsorption pressure. Isothermal adsorption-desorption operations in the temperature range 400–900° F. are preferred although satisfactory results have been obtained when desorption temperatures in the range 100–400° F. higher than adsorbent temperatures have been employed. As indicated hereinabove, any suitable desorption temperature may be employed in the practice of the invention. It is preferred, however, to carry out the desorption operation at elevated temperatures, about 100–400° F. higher than the adsorption temperature, such as a temperature in the range 700–1100° F. However, excessively high temperatures, e.g., greater than about 1100–1300° F. should be avoided in those operations wherein Linde 5A Molecular Sieve is employed as the alumino-silicate adsorbent because such high temperatures lead to the destruction of the adsorbent presumably by collapse of the crystal structure.

Although it is possible to effect desorption of the compounds from the solid adsorbent by heat alone, such as radiant heat or by direct or indirect heat exchange, it is particularly effective to carry out the desorption operation in conjunction with a gaseous desorbing medium. A suitable gaseous desorbing medium is one having molecules sufficiently small that penetration of the pores of the adsorbent may be effective. Examples of the suitable desorbing medium include such normal gaseous materials as nitrogen, methane, hydrogen, carbon dioxide, carbon monoxide, flue gas, natural gas and the like, including air under controlled temperature conditions, and steam, preferably superheated steam. However, any inert vaporizable material which possesses relatively high molal heat capacity for example n-butane, isobutane, the $C_5$ hydrocarbon, or mixtures thereof, and which is readily separable as by distillation from the desorbed compounds is suitable.

Following a number of adsorption-desorption operations with the resultant accumulation of a substantial amount of tarry material on the surface of the adsorbent, the solid selective adsorbent is contacted with a normally liquid organic solvent for said tarry material at an elevated temperature in the range 55–225° C. or higher, preferably at about the boiling point of the solvent under the conditions of contacting to effect removal of the coating formed on the surface of the adsorbent. Suitable solvents which may be employed are the alcohols, ethers, esters, ketones, aromatic and non-straight chain hydrocarbons and the halogenated hydrocarbons. Representative alcohols include methanol, ethanol, propanol, isopropanol, n-butanol, sec-butanol, tert-butanol, pentanol and their isomers and higher molecular weight homologues; polyhydroxyl alcohols are also suitable, such as ethylene glycol, propylene glycol, glycerol and the like. Ethers that are solvents for the carbonaceous material include methyl ether, ethyl ether, propyl ether, and butyl ether, and the mixed ethers, such as methyl ethyl ether, propyl ethyl ether, butyl propyl ether and the like. Ester solvents for the carbonaceous material include methyl formate, methyl acetate, ethyl acetate, methyl propionate and propyl formate. Suitable ketone solvents include acetone, diethyl ketone, dipropyl ketone, dibutyl ketone, methyl ethyl ketone, methyl propyl ketone, methyl isobutyl ketone and the like. Aromatic hydrocarbons which exert a solvent action on the tarry, carbonaceous material deposited on the adsorbents include benzene, toluene, the xylenes, ethylbenzene, trimethyl benzene and the like. Halogenated hydrocarbons are among the better solvents for the removal of tarry, carbonaceous materials and representative numbers include carbon tetrachloride, chloroform, chlorobenzene, dichlorobenzene, chlorotoluene, benzylchloride and the like.

Contact between the alumino-silicate adsorbent and the organic solvent may be made at any suitable temperature and pressure provided the solvent is maintained in a liquid state. It is preferable, however, to maintain the organic solvent at an elevated temperature at about the normal atmospheric boiling point of the solvent or solvent mixture employed. Particularly effective solvent action is obtained by refluxing the solvent on the adsorbent being treated. The length of time that the solid is in contact with the adsorbent is not critical so long as sufficient contact time is provided to reduce the tarry, carbonaceous deposit below 1.5 percent by weight of the solid adsorbent. Generally, a refluxing period of from 0.1 to 10 hours is usually sufficient to reduce the amount of carbonaceous material below the above-referred amount when treating an adsorbent containing more than 1.5 percent by weight carbonaceous material, such as about 5.0 percent by weight tarry deposit.

In accordance with one embodiment of the invention, the organic solvent employed in the extraction step will have a critical molecular diameter larger than the effective pore diameter of the selective adsorbent under treatment. Under such conditions, the solvent does not enter the pores of the adsorbent but remains on the surfaces thereof. This is advantageous because the solvent can be readily removed from the surface of the adsorbent by evaporation under relatively mild heating conditions. In cases where a solvent which can be adsorbed within the pores of the adsorbent is employed to extract the carbonaceous material, some of this solvent will be adsorbed in the pores of the adsorbent and more severe adsorbent regeneration and solvent recovery conditions are required.

In the case of solid selective adsorbents having pore diameters of about 4–5 Angstrom units, such as the Linde 5A Molecular Sieve, extraction solvents having critical molecular diameters greater than the diameter of the pore openings of the adsorbent may be selected from the above indicated classes of solvents. Solvents which would not be pore-adsorbed include the sec- and tert-alcohols such as isopropyl alcohol, secondary butyl alcohol, tertiary butyl alcohol, methyl isobutyl ketone, methyl isopropyl ether, the xylenes, toluene, benzene, and chlorobenzene.

Following the solvent extraction of the tarry, carbonaceous material the solvent containing dissolved tars is separated from the adsorbent in order to permit the drying of the adsorbent. The adsorbent may first be separated from the bulk of the solvent by physical separation, such as by filtration or decantation, then the adsorbent, now wetted by a surface adhering layer of solvent, is subjected to the evaporation under mild conditions, e.g., by heating to about the boiling point of the solvent or higher, to remove this solvent and to dry the adsorbent. Suitable drying temperatures are in the range of about 75–300° F. and higher.

When the adsorbent has been dried, it will still be coated with below about 1.5 percent by weight of a tarry, carbonaceous residue amounting e.g., to about 1 percent more or less. This material is particularly tenacious due to the fact that frequently a portion of all of it has been reduced to carbon or a relatively high carbon content material which does not lend itself to solvent extraction. To effect removal of this retained, residual carbonaceous material, the adsorbent is heated to an elevated temperature in the presence of oxygen-containing gas. Such temperatures will normally be in the range of 600–900° F., more or less, sufficient to oxidize the carbonaceous material without giving rise to excessively high temperatures in the range 1100–1300° F., which would destroy the adsorbent. The oxygen-containing gas may be air or any oxygen-containing gas. This gas should contain about 2 percent to 20 percent oxygen by volume, preferably in the range 3–8 percent. Under these conditions the carbonaceous material is readily substantially completely removed from the adsorbent. On completion of this step, the adsorbent is ready to be recycled back to the adsorption step to be contacted with additional fresh hydrocarbon feed.

Referring now to Figure 1, which is a blocked out diagram of the process of the invention, a hydrocarbon feed mixture such as a naphtha or gasoline fraction, containing straight chain and non-straight chain hydrocarbons is passed into an adsorption zone containing a solid selective adsorbent adapted to selectively adsorb straight chain hydrocarbons to the substantial exclusion of non-straight chain hydrocarbons. The adsorption zone is maintained at a temperature within the range 300–700° F. and at a pressure from atmospheric to about 2000 p.s.i.g. Following the adsorption operation, a treated hydrocarbon effluent substantially free of straight chain hydrocarbons is removed from the system, preferably with the aid of a sweep gas, and collected as a finished product.

Following recovery of the treated effluent from the adsorption zone, the adsorbent, now containing adsorbed straight chain hydrocarbons, is subjected to desorption conditions to remove the pore-adsorbed straight chain hydrocarbons. The desorption operation is carried out at a temperature above the adsorption temperature, preferably 100° to 500° above the adsorption temperature, in the range of about 700° F. to 1100° F. It is advantageous at this point to reduce the pressure in the system preferably to about atmospheric pressure. Desorption is hastened by directly contacting the adsorbent with a hot purge gas. Suitable purge gases include natural gas, nitrogen, hydrogen, carbon dioxide, carbon monoxide, butane, isobutane, etc. Carbon dioxide is particularly suitable as a purge gas since it can readily be separated from the desorbed straight chain hydrocarbons by solvent extraction or washing e.g., by washing with a water or alkaline solution at an elevated pressure. The carbon dioxide can be recovered from the fat wash liquor by heating and/or pressure reduction, or acid springing and recycled. The straight chain hydrocarbons desorbed from the adsorbent are separately recovered and passed out of the system and recovered as a product or introduced to other treatment such as isomerization, catalytic reforming or alkylation for upgrading into a relatively high octane motor fuel.

Following a number of adsorption-desorption cycles as described above, the adsorbent will eventually exhibit a substantially reduced capacity in that a lesser amount of straight chain hydrocarbons will be adsorbed from the hydrocarbon stream. This will be reflected in a reduced octane improvement in the treated naphtha or gasoline removed from the adsorption zone. Analysis of the selective adsorbent shows that the adsorbent is coated with a tarry, carbonaceous material amounting in some instances to as much as 5–7 percent or more by weight of the adsorbent.

Regeneration of the selective adsorbent to remove this tarry, carbonaceous material and to return the adsorbent to substantially its original capacity must be undertaken if the capacity of the adsorbent is not to be irreparably impaired. The selective adsorbent together with the tarry, carbonaceous material deposited on the surface thereof is contacted with a liquid solvent for the carbonaceous material to extract this material from the surface of the adsorbent. This is accomplished within the adsorption-desorption zone or, alternatively, in a separate vessel. The solvent is heated, preferably to boiling point, and refluxed in contact with the adsorbent until a substantial amount of carbonaceous layer has been removed from the adsorbent, i.e., until the carbonaceous deposit amounts to not more than about 1.5 percent by weight of the adsorbent.

Following the solvent extraction opertaion, the solvent is separated from the adsorbent by physical means. The bulk of the solvent is filtered off and the remaining surafce adhering solvent evaporated from the adsorbent. The separated solvent containing tarry, carbonaceous material dissolved therein is passed into a solvent recovery system to recover this solvent and to recycle the recovered solvent recycled to the extraction step.

The adsorbent, after drying to remove substantially all of the surface adhering solvent therefrom, having a reduced amount of carbonaceous material, i.e., less than 1.5 percent by weight of the adsorbent is contacted with an oxygen-containing gas at a temperature in the range of 500–900° F. more or less. The oxygen-containing gas contains oxygen in an amount in the range 2–20 percent by volume. This oxygen-containing gas is introduced under controlled conditions so as to oxidize the tarry, carbonaceous deposit on the surface of the adsorbent without permitting the oxidation temperature or temperature to which the adsorbent is exposed to reach such a high value that the structure of the adsorbent is adversely affected. This burning or oxidation of the carbonaceous material is completed in a relatively short time and the adsorbent regenerated to substantially its original capacity.

Illustrative of the practice of the invention, a vaporized hydrocarbon mixture, such as a catalytic reformate containing straight chain hydrocarbons and non-straight chain hydrocarbons including aromatic hydrocarbons, is contacted with a calcium alumino-silicate solid selective adsorbent, Linde Type 5A Molecular Sieve, at 625° F. 60 p.s.i.g. to effect adsorption for the straight chain hydrocarbons. The resulting treated reformate substantially free of straight chain hydrocarbons is separately removed as product. The adsorbent, now containing adsorbed straight chain hydrocarbons, is contacted at 625° F. and about 0 p.s.i.g. with a gaseous desorbing medium as sweep gas such as isobutane or $CO_2$ at a space velocity in the range 0.2–10 v./hr./v.

After at least about 10 of the above described adsorption-descorption cycles, the adsorbent is recovered and when the amount of surface-deposited carbonaceous material amounts to not less than 1.5 percent by weight of the adsorbent, usually about 5 percent by weight, the adsorbent is contacted with liquid methyl isobutyl ketone at about its boiling point for about 0.5–3 hours, so as to dissolve a substantial portion of the carbonaceous deposit from the adsorbent. The adsorbent is separated from the bulk of the solvent by decantation or filtration and any solvent adhering to the adsorbent is evaporated therefrom leaving the adsorbent in a dry condition.

The dried absorbent having a reduced amount of carbonaceous material, i.e., less than about 1.5 percent by weight, is heated to about 600–800° F. in the presence of a gas, e.g., flue gas, containing about 5 percent by volume $O_2$ so as to oxidize and burn away the carbonaceous material from the adsorbent. Oxidation of the carbonaceous material, is completed in a relatively short time and the adsorbent substantially completely regenerated to its original capacity. The thus treated absorbent is then recycled to the adsorption operation to contact additional hydrocarbon feed.

Although the process of the invention has been particularly described in connection with alumino-silicate selective adsorbents, it is to be understood that the practice of the invention is also suitable for the treatment of other noncarbonaceous solid selective adsorbents which adsorb one component of an organic mixture to the substantial exclusion of other components of the mixture and exhibit a deactivation of the adsorbent by the deposition of a carbonaceous deposit on the surface of the adsorbent during desorption of the adsorbed component. Solid selective adsorbents which may be suitably treated in accordance with the practice of this invention include the various oxide gels such as silica gel, also aluminum oxide, tin oxide, iron oxide, chromium oxide and the like.

Although a preferred embodiment of the invention has been described herein, it will be understood that various changes and modifications may be made therein, while securing to a greater or lesser extent some or all of the benefits of the invention, without departing from the spirit and scope thereof.

We claim:

1. In a process wherein an alumino-silicate molecular sieve selective adsorbent, said adsorbent being made up of porous crystals having a pore diameter of about 5 Angstrom units, sufficiently large to permit the entry and adsorption of straight chain hydrocarbons to the substantial exclusion of non-straight chain hydrocarbons, is employed for the fractionation of a hydrocarbon mixture by selectively adsorbing straight chain hydrocarbons within the pores of the adsorbent to the substantial exclusion of non-straight chain hydrocarbons followed by desorption of the pore-adsorbed straight chain hydrocarbons, and wherein the adsorptive capacity of the adsorbent is substantially reduced after a number of adsorption-desorption cycles carried out at temperatures in the range 300–1000° F. due to the blocking of the pores of the adsorbent by the accumulation of a relatively high molecular weight, tarry, carbonaceous deposit on the surface of the adsorbent in an amount greater than 1.5 percent by weight of the adsorbent, the improvement which comprises contacting the thus-depleted adsorbent at a temperature in the range 55–225° C. with a liquid solvent exhibiting solvent properties for said carbonaceous deposit until said carbonaceous deposit has been reduced below 1.5 percent by weight of the adsorbent, said solvent possessing molecular dimension such that the solvent is not adsorbed within the pores of the adsorbent, separating said adsorbent from said solvent, and contacting said adsorbent, now containing a residual carbonaceous deposit in an amount less than 1.5 percent by weight with an oxygen-containing gas at an elevated temperature not in excess of 1100° F., said oxygen-containing gas having an oxygen content in the range 2–20% by volume, to effect oxidation of the residual carbonaceous deposit without adversely affecting the adsorptive capacity of said adsorbent.

2. In a process wherein a sodium calcium aluminosilicate molecular sieve selective adsorbent, said adsorbent being made up of porous crystals having a pore diameter of about 5 Angstrom units, sufficiently large to permit the entry and adsorption of straight chain hydrocarbons to the substantial exclusion of non-straight chain hydrocarbons, is employed for the fractionation of a hydrocarbon mixture by selectively adsorbing straight chain hydrocarbons within the pores of the adsorbent to the substantial exclusion of non-straight chain hydrocarbons, followed by desorption of the pore-adsorbed straight chain hydrocarbons by means of a gaseous desorption medium selected from the group consisting of isobutane and $CO_2$, and wherein the adsorptive capacity of the adsorbent is substantially reduced after a number of adsorption-desorption cycles carried out at temperatures in the range 300–1000° F. due to the blocking of the pores of the adsorbent by the accumulation of a relatively high molecular weight, tarry, carbonaceous deposit on the surface of the adsorbent in an amount greater than 1.5 percent by weight of the adsorbent, the improvement which comprises contacting the thus-depleted adsorbent with liquid methyl isobutyl ketone at its boiling point and until said carbonaceous deposit has been reduced below 1.5 percent by weight of the adsorbent, separating said adsorbent from said solvent, and contacting said adsorbent, now containing a residual carbonaceous deposit in an amount less than 1.5 percent by weight, with air at an elevated temperature in the range 500–900° F. to effect oxidation of the residual carbonaceous deposit without adversely affecting the adsorptive capacity of said adsorbent.

References Cited in the file of this patent

UNITED STATES PATENTS

| | | |
|---|---|---|
| 1,946,748 | Lewman et al. | Feb. 13, 1934 |
| 2,306,610 | Barrer | Dec. 29, 1942 |
| 2,398,101 | Lipkin | Apr. 9, 1946 |
| 2,413,134 | Barrer | Dec. 24, 1946 |
| 2,420,761 | Thomas | May 20, 1947 |
| 2,457,556 | Heinemann et al. | Dec. 28, 1948 |
| 2,522,426 | Black | Sept. 12, 1950 |
| 2,571,380 | Penick | Oct. 16, 1951 |
| 2,572,433 | Bergstrom et al. | Oct. 23, 1951 |
| 2,621,203 | Cope | Dec. 9, 1952 |
| 2,673,176 | Whitney | Mar. 23, 1954 |